W. PETERSON.
SEAT FOR VEHICLES.
APPLICATION FILED MAR. 11, 1914.
1,114,801.
Patented Oct. 27, 1914.
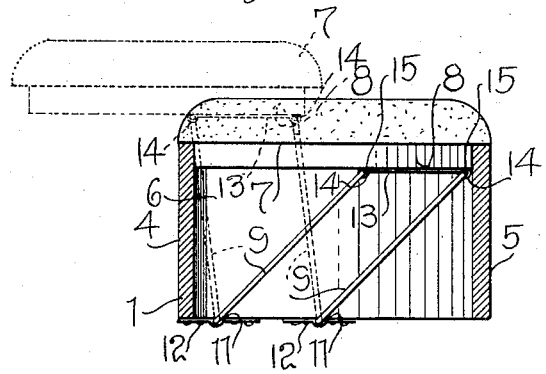
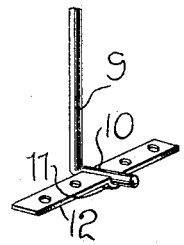
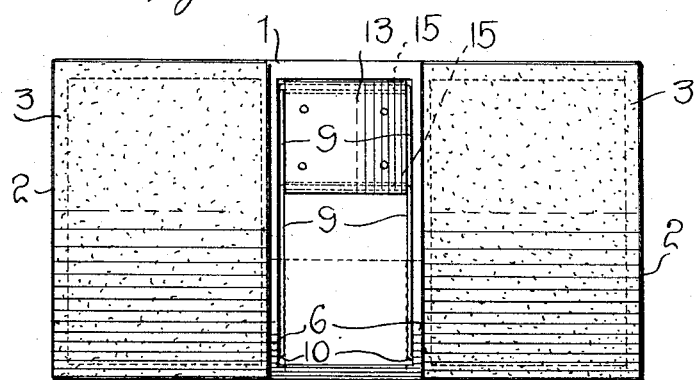
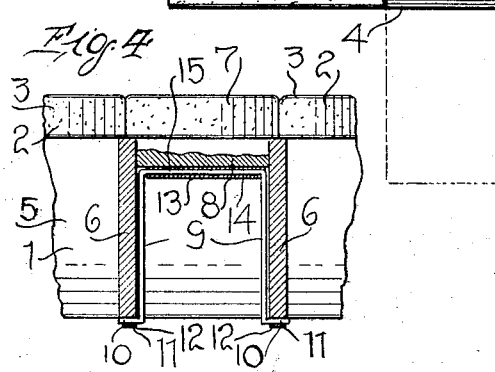
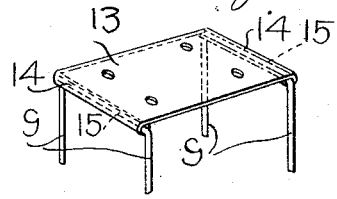
Inventor
WILLIS PETERSON

UNITED STATES PATENT OFFICE.

WILLIS PETERSON, OF FRANKFORT, MICHIGAN.

SEAT FOR VEHICLES.

1,114,801.  Specification of Letters Patent.  Patented Oct. 27, 1914.

Application filed March 11, 1914. Serial No. 823,997.

*To all whom it may concern:*

Be it known that I, WILLIS PETERSON, a citizen of the United States, residing at Frankfort, in the county of Benzie and State of Michigan, have invented certain new and useful Improvements in Seats for Vehicles, of which the following is a specification, reference being had to the accompanying drawings.

This invention relates to certain improvements in seats for vehicles, such as buggies or other passenger conveying devices; and the object of the invention is to provide a device of this general character having novel and improved means whereby a middle seat is afforded which normally serves as a portion of the seat proper but which may be adjusted upwardly and forwardly relative to the seat when the necessities of practice may so require.

The invention consists in the details of construction and in the combination and arrangement of the several parts whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceed to describe the same with reference to the accompanying drawings, wherein—

Figure 1 is a view taken transversely through a seat constructed in accordance with an embodiment of my invention; Fig. 2 is a view in top plan of the device as illustrated in Fig. 1, with the middle seat proper omitted in order to illustrate certain details of the construction as herein contained; and a second position of such middle seat is indicated by dotted lines; Fig. 3 is a fragmentary view in perspective illustrating a mounting for the brackets as herein disclosed; Fig. 4 is a fragmentary view in front elevation and partly in section of the device as herein set forth; and Fig. 5 is a fragmentary view in perspective illustrating a means whereby connection is had with the middle seat.

As disclosed in the accompanying drawings, 1 denotes a vehicle seat frame of conventional type and, as herein set forth, especially adapted to be applied to the body of a buggy and having fixedly secured at the opposite extremities thereof the spaced seat portions 2 cushioned, as indicated at 3, for purposes of comfort. As herein disclosed, the front board 4 and the back board 5 of the seat frame are further connected or tied intermediate their length by the brace members 6, such members being positioned adjacent the inner ends of the seat members 2 and adapted to afford an additional supporting means for the intermediate or middle seat 7 and on which such intermediate or middle seat normally rests. When in such normal position, the middle seat forms substantially a combination of the seat sections 2—2, as is believed to be obvious. When it is desired that a third person occupy the seat, it is only necessary that the intermediate or middle seat 7 be adjusted upwardly and forwardly relative to the seat frame 1, whereby it will be seen that such middle seat is so positioned as to permit the third person to occupy the same without in any way inconveniencing the remaining persons.

As herein disclosed, the under frame 8 of the intermediate or middle seat has secured thereto, adjacent its opposite ends, the depending U-shaped brackets 9 the free end portions of the stems of which are extended outwardly at substantially right angles, as indicated at 10, whereby such brackets may be readily and conveniently connected to the under edge of the brace members 6. As will hereinafter be self-evident, the connection between the brackets and the frame 1 must be a pivotal one, and in order to provide such connection, the angular extremities 10 are rotatably mounted in the bearings 11 afforded by the straps 12 suitably secured to the under edge of the brace members 6 at such a point thereon that the middle seat 7, which is operatively connected to the brackets 9 in a manner to be hereinafter referred to, will be caused to swing upwardly and forwardly of the seat frame 1, as is believed to be clearly shown in the drawings. To the lower edges of the under frame 8 of the intermediate or middle seat 1 and adjacent the rear end thereof is suitably secured a metallic plate 13 preferably of rectangular form and having its opposite end portions rolled or bent backwardly upon such plate to afford bearing members 14, adapted to accommodate the bases 15 of the brackets 9, whereby it will be readily observed that an effective pivotal engagement is afforded between such brackets and the intermediate or middle seat, which is essential in a device of the character described; and it is to be further observed that the distance between the bearings 14 is equal to the distance between the forward and rear bearings 11, whereby the relative movement of the middle or intermediate section 7 and the seat frame 1 is in the nature of a parallelogram. It is thought to be obvious that a middle seat constructed in accordance with my invention is always in position to be used and that its elevated position is controlled by contact of the stems of the forward bracket 9 with the upper marginal portion of the front board 4 of the seat frame 1.

I do not wish to be understood as limiting myself in any manner whereby the cushions 3 on the seat sections 2—2 may be formed or the cushion 16 of the intermediate seat, but I prefer that the same be of the same relative thickness and that the covering therefor be smooth.

From the foregoing description, it is thought to be obvious that a vehicle seat constructed in accordance with my invention is of an extremely simple and comparatively inexpensive nature and is particularly well adapted for use by reason of the convenience and facility with which the various parts, comprised therein, may be assembled and of the convenience and facility whereby the intermediate or middle seat may be adjusted into its different positions and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

Having thus fully described my invention what I desire to claim and secure by Letters Patent, is:

A device of the character described comprising a seat frame, spaced seat sections fixedly secured to the opposite extremities of the seat frame, transverse brace members for the seat frame adjacent the inner ends of the seat sections, an intermediate seat adapted to be supported by the seat frame and the brace members, a plate secured to the under portion of the middle seat at the rear thereof, U-shaped brackets having their bases pivotally engaged with the opposite end portions of the plate, and means for pivotally connecting the free extremities of the stems of the brackets with the under surface of the braces of the seat frame adjacent the front thereof.

In testimony whereof I hereunto affix my signature in the presence of two witnesses.

WILLIS PETERSON.

Witnesses:
 ROBT. J. DENTON,
 JOHN E. DENTON.

---

Copies of this patent may be obtained for five cents each, by addressing the "Commissioner of Patents, Washington, D. C."